United States Patent [19]

Lahti et al.

[11] 4,376,976
[45] Mar. 15, 1983

[54] OVERLAPPED MACRO INSTRUCTION CONTROL SYSTEM

[75] Inventors: Archie E. Lahti, Fridley; Kenneth L. Engelbrecht, Blaine; Donald R. Kalvestrand, White Bear Lake, all of Minn.

[73] Assignee: Sperry Corporation, New York, N.Y.

[21] Appl. No.: 174,035

[22] Filed: Jul. 31, 1980

[51] Int. Cl.³ .............................................. G06F 9/38
[52] U.S. Cl. .................................................... 364/200
[58] Field of Search ... 364/200 MS File, 900 MS File

[56] References Cited
U.S. PATENT DOCUMENTS 4,080,648 3/1978 Asano et al. ...................... 364/200

Primary Examiner—Raulfe B. Zache
Attorney, Agent, or Firm—Charles A. Johnson; Kenneth T. Grace; Marshall M. Truex

[57] ABSTRACT

A system for overlapping macro instruction execution is described for use in a data processing system. A pair of control storage devices each store the micro instruction sets required to execute all macro instructions in the repertoire and are used for alternate macro instructions. Each of the controlled storage devices is addressable to entry addresses by the macro instructions. After entry, addressing is by the contents of the micro instructions with provision made for conditional branching. An overlap count storage device is provided for storing overlap counts for all possible sequences of macro instructions. These overlap counts define the number of micro instructions of the current macro instruction that must be executed before the next macro instruction can proceed. Micro instruction execution is by clock cycle and are counted as they are executed. The count is compared to the stored overlap count for the current sequence of macro instructions and overlap execution is enabled when comparison is found. Overlap of macro instruction execution is allowed to occur when the current remaining micro instructions for the current macro instruction define functions that are mutually exclusive with the functions controlled by the next macro instruction. During overlap, micro instructions are loaded in an execution register from both control storage devices. Overlapping instructions that have variable execution sequences is controlled by halting the count of micro instruction executions until the variable sequence has been completed.

33 Claims, 20 Drawing Figures

| 0 — — — 5 | 6 | 7 — — — — — 16 | n |
|---|---|---|---|
| INSTRUCTION GROUP FIELD | MIN. DELAY | MICRO INSTRUCTION ENTRY ADDRESS | OTHER USES |
*Fig. 4*
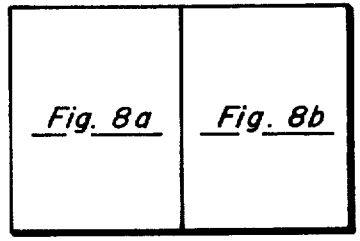
*Fig. 5*
| a-bits | b-bits | k-bits | j-bits |
|---|---|---|---|
| NEXT ADDRESS | BRANCH CONDITIONS | CONTROL | MICRO INSTRUCTION |
*Fig. 6*
| Fig. 8a | Fig. 8b |
|---|---|
*Fig. 8*
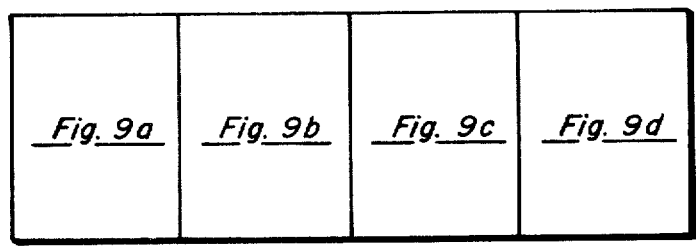
*Fig. 9*

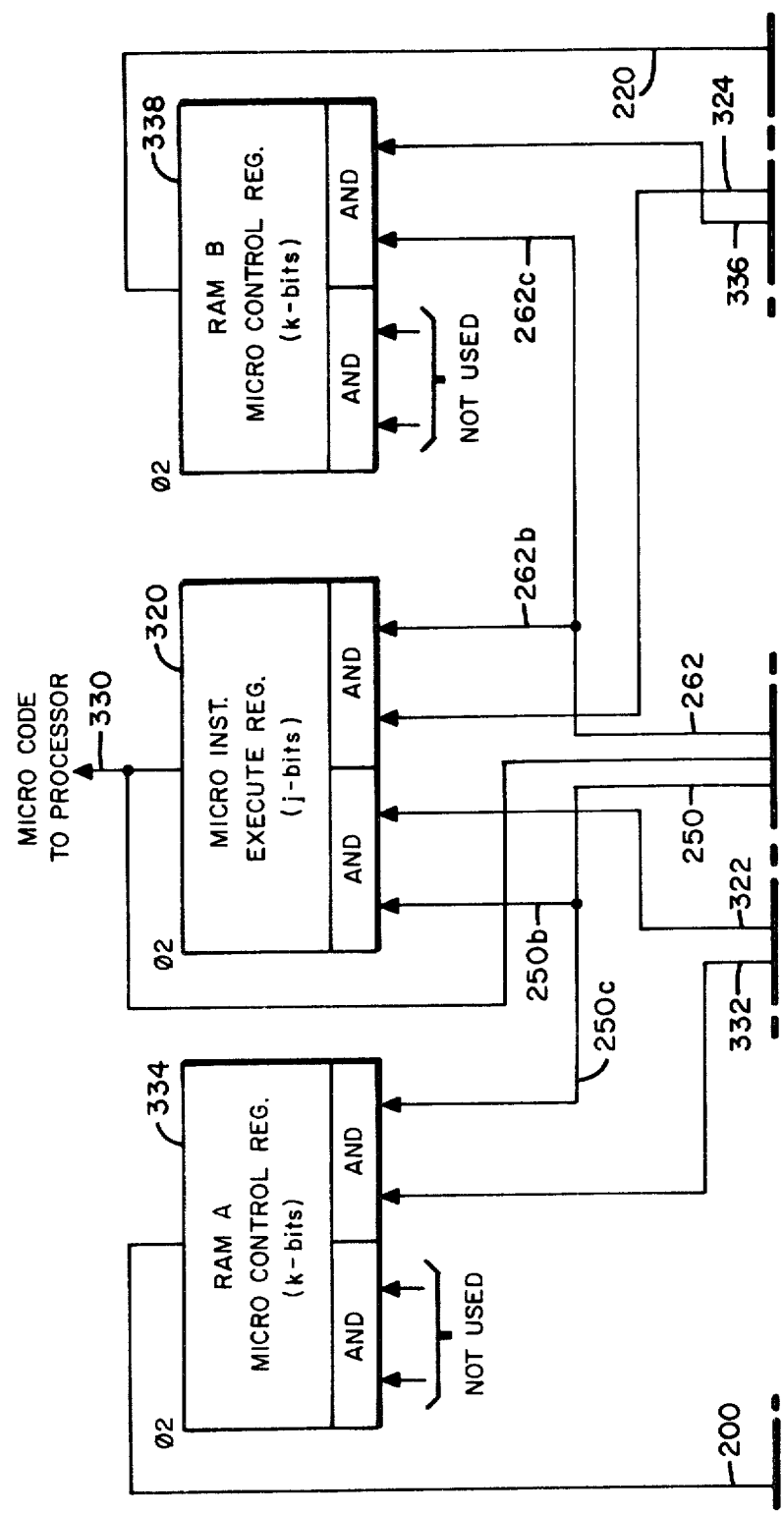

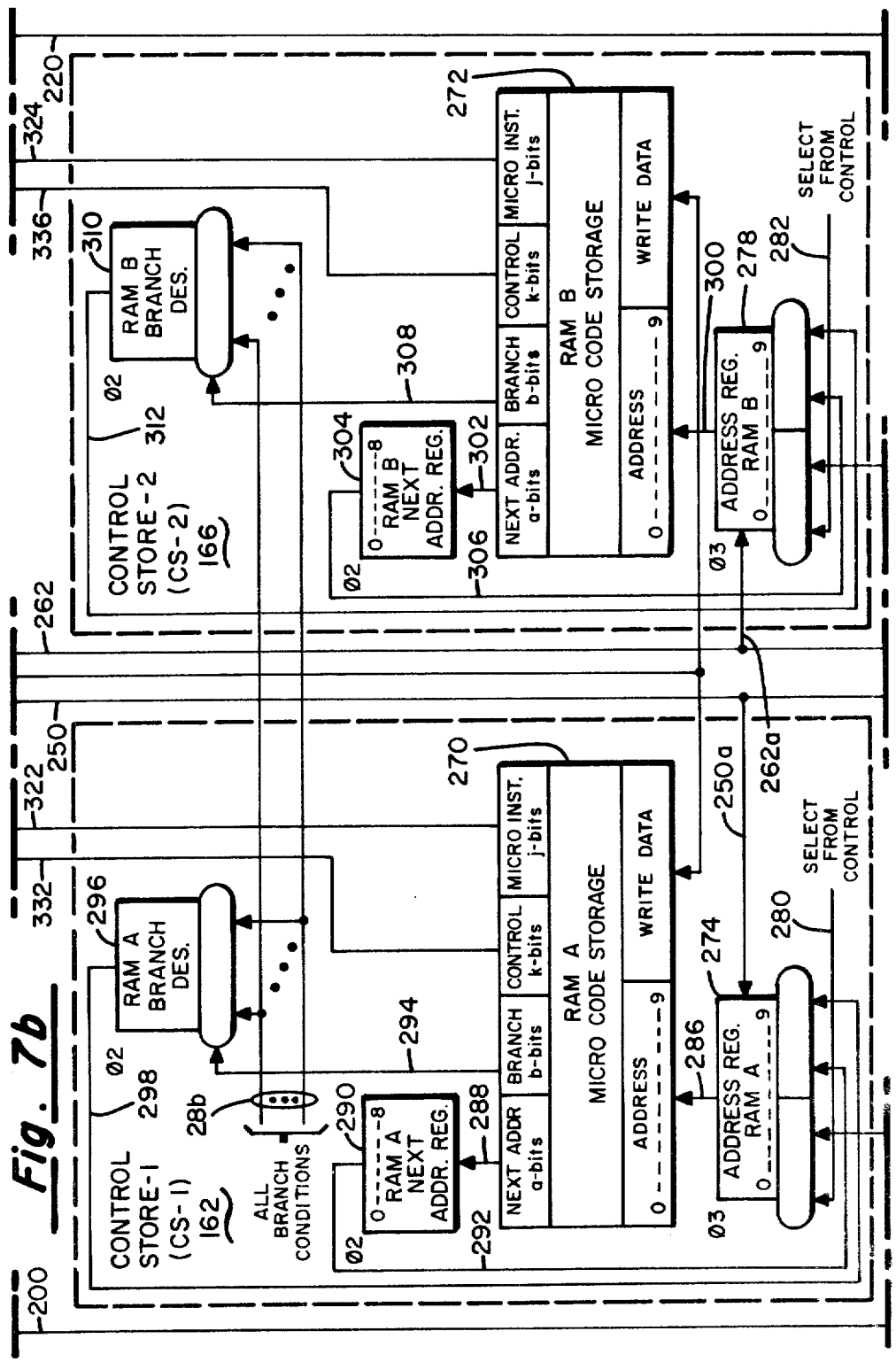

OVERLAPPED MACRO INSTRUCTION CONTROL SYSTEM

BACKGROUND OF THE INVENTION

This invention relates to programmable digital data processors, with particular emphasis on the overlapping of macro instructions in execution for an Arithmetic Processor (AP). In the development and advance in the data processing systems there has been an ever-increasing emphasis on increasing the data processing rate.

Increases in computing rates have been achieved through advances in physical technologies relating to the hardware and hardware functioning. The advent of integrated circuitry gave rise to circuit components operable at very fast computing rates, and capable of performing complex functions while remaining economically feasible. Access and cycle time of memories has also been markedly decreased.

In addition to the changes and developments in the hardware, there have been continuing advances in the organizational architecture of data processing system that provide for ever-increasing utilization of the various data processing components. While many examples of optimization of utilization of the components comprising the data processing systems can be described, attention will be directed to the concept of increasing data processing rates by providing for an overlap of macro instruction execution.

It has been known for some time that instructions in data processing systems that basically provide for the steps of instruction procurement and instruction decoding, instruction operation, and storage of results, could be overlapped such that once an existing instruction was procured from the memory and the current instruction passed into execution, the memory would be available for accessing for the next instruction. This allowed overlapping of the instructions primarily based upon the availability of access to the memory unit. This type of instruction overlapping was most common in the data processors that involved so-called hardwired instruction repertoire and control.

Later developments lead to data processing systems that utilized a repertoire of macro instructions each of which performed some predetermined function in the data processing system. The macro instructions are characteristically at the user level, are programmed and stored in a memory unit for retrieval and execution as the particular program progresses. In systems of this type, a control store is utilized for storing sets of micro instructions, each one of the stored sets relating to an associated one of the macro instructions. The execution of a selected macro instruction is accomplished by the execution of each one of the micro instructions in the corresponding set thereof. In the execution of each micro instruction, control signals are produced and fed to the Arithmetic Processor to control the processing of data in accordance with the controls specified by each of said micro instructions. In current technology the control store would be either a Random Access Memory (RAM) or a Read Only Memory (ROM). The ROM has the advantage of relatively faster operating rates in that the regenerative cycle for the RAM is not needed, but has the relative disadvantage that the predetermined sets of micro instructions must be totally and completely defined prior to fabrication since the conditions that define each micro instruction are determined during fabrication. The RAM has the relative disadvantage of being somewhat slower in overall operation rate as the time is required for the regeneration cycle following each read operation. However, the RAM has the relative advantage of providing versatility for the control store in that the sets of micro instructions can be altered by simply writing new control micro instructions into the control memory.

This invention addresses the problem of overlap of macro instructions of the type just described, and provides a system that enhances the system operation by accomplishing the overlap of macro instructions.

SUMMARY OF THE INVENTION

With the foregoing background of the invention in mind, and in accordance with the present invention, an improvement in a digital data processing system having a predetermined repertoire of macro instructions and for controlling the overlap of execution of sequential macro instructions is provided. Two separate control store devices are utilized, each one storing the sets of micro instructions required for the execution of the repertoire of macro instructions for the system. Each control store is capable of reading out a portion of the micro instructions that is utilized to control an elementary function or operation of the Arithmetic Processor, and a second portion of the micro instruction for designating the address and branch conditions for the selection of the next micro instruction. The entire operation is under the control of a clock, and one micro instruction is transferred for control of the Arithmetic Processor per clock cycle. A cycle counter is associated with each of the control store devices, and upon being activated provides a count of the number of cycles, that is individual micro instruction executions, that have occurred during the particular macro instruction execution. An overlap count storage device is utilized for the storage of cycle count information for all possible combinations of sequences of macro instructions for the entire repertoire. The count information for each sequence of occurence of macro instructions defines a number of cycles in the current macro instruction execution that must take place before the next subsequent macro instruction can be initiated. A pair of comparators function to compare the controlling cycle count read from the storage device that holds the counts, and compares the count to read with the results of the two cycle counter just described. When the cycle counter for the control store device then in control of execution of a macro instruction is determined to be equal to or exceed the control count, the alternate control store device is activated and the next subsequent macro instruction is allowed to proceed.

Overlap of execution is only allowed to occur when the controlling functions between the micro instructions occurring for the two macro instructions do not interfere. That is, from the point of overlap and on to the execution of the last micro instruction, the control signals must be mutually exclusive. An output register is coupled to the output of each of the control store devices and is capable of receiving the pair of micro instructions during overlap such that each bit position in the two micro instructions are ORed together for setting associated positions in the micro execute control register.

Each macro instruction is read in sequence to a decode register. A portion of the macro instruction is utilized as the entry point address for the particular macro instruction to be executed. The entry point address is directed to the selected one of the control storage devices, and upon initiation of execution of that macro instructions, the addressing of successive micro instructions and branch instructions is under the control of the control store device. The function code portion of the macro instruction is utilized in conjunction with the next subsequent macro instruction function code for purposes of selecting an address that defines the overlap cycle count that must occur for that particular sequence of macro instructions.

The system allows the accommodation of execution of macro instructions that may have variable execution duration requirements based upon data dependent or external factors that must be satisfied. A control system is provided for sensing the occurence of data dependent and variable duration sequences, and inhibits the advancement of the associated cycle counter until it has been signaled that the variable portion of the then functioning macro instruction has been completed. When the variable portion has been completed, the overlap control is allowed to proceed as previously described.

When a sequence of micro instructions has been completed, a signal is issued to halt the counting of the associated cycle counter and the control section is signaled that consideration of overlapping of the second subsequent macro instruction can commence.

From the foregoing, it can be seen that the macro instruction overlap control provides an efficiency of utilization of commonly available functions and increases the efficiency of the data processing system, and effectively increases the rate of through-put of the system.

OBJECTS

With the foregoing background of the invention and the summary of the invention in mind, it is therefore an object of this invention to provide a system for controlling the overlapped execution of macro instructions in a data processing system, where each macro instruction is performed by the execution of an associated set of micro instructions.

It is a further object of this invention to provide a system for overlapping the execution of macro instructions by providing a pair of control store devices, each of which are independently addressable and have the sets of micro instructions for each macro instruction stored at identical addresses, together with a system for determining the point at which overlapped execution of successive macro instructions can occur.

Still a further object of this invention is to effectively provide for the overlap of execution of macro instructions where individual ones of the macro instructions may include variable length sequences.

These and other objects and advantages of the invention will become apparent to those having skill in the art upon the reading of the following detailed description taken in conjunction with the accompanying drawings in which:

DESCRIPTION OF THE DRAWINGS

FIG. 4 illustrates the format of the macro instruction word;

FIG. 5 illustrates the format of the overlap count word established for each combination of sequences of macro instructions in the repertoire;

FIG. 6 illustrates the format of the micro code control words stored in the control devices, including the micro code control signals and the micro instructions;

DESCRIPTION OF THE PREFERRED EMBODIMENT

Figure 1:
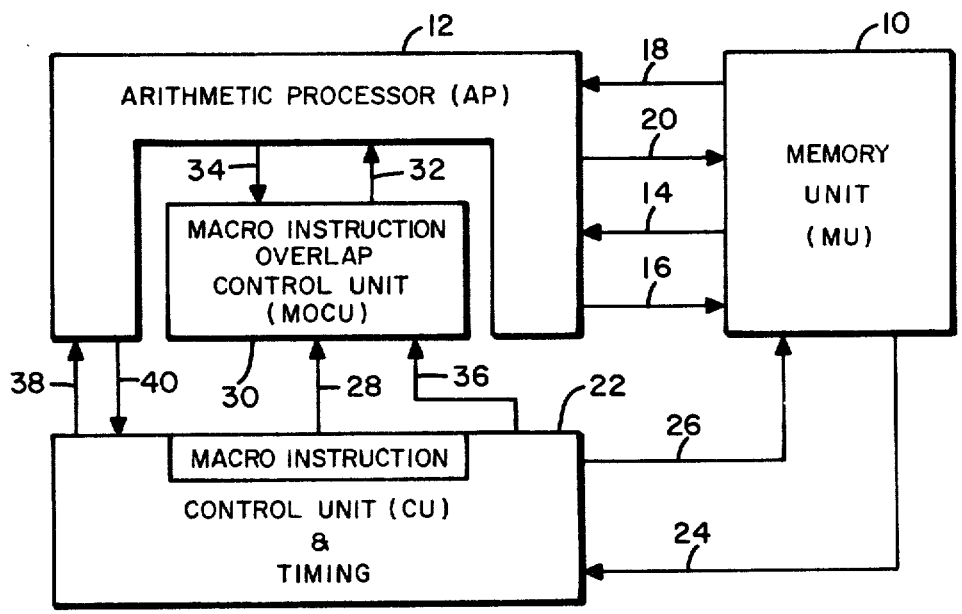
FIG. 1 is a system block diagram of a data processing system that utilizes the current invention for the overlap of execution of macro instructions.

Referring now to FIG. 1, there is shown a system block diagram of a data processing system that utilizes the current invention. This drawing will be used to explain the organization and functional operation of the invention as it relates to the data processing system.

The data processing system of FIG. 1 includes a Memory Unit (MU) 10, which is of the conventional nature and may be selected from various memories available. The Memory Unit 10 is utilized for storing operands and macro instructions. There is also included an Arithmetic Processor (AP) 12 which provides the processing for the system. The Memory Unit 10 provides operands over cable 14 to the Arithmetic Processor 12, and receives operands for storage over cable 16 from Arithmetic Processor 12. Control signals are passed from the Memory Unit 10 over cable 18 to the Arithmetic Processor 12 and receives control signals over cable 20. The data processing system also utilizes a Control Unit (CU) 22 for performing the control functions for execution of instructions by the data processing system. The Control Unit 22 also provides for the clock timing. The Control Unit 22 receives macro instructions from the Memory Unit 10 over cable 24, together with control signals, and provides control signals to Memory Unit 10 over cable 26. The macro instructions read by the Control Unit 22 are translated and made available as an output on cable 28. The Macro Instruction Overlap Control Unit (MOCU) 30 is interrelated both with the Arithmetic Processor 12 and the Control Unit 22, and functions to receive macro instructions on cable 28 and provide a sequence of micro instructions on cable 32 to the Arithmetic Processor 12. The MOCU 30 receives control signals from the Arithmetic Processor 12 on cable 34. The MOCU 30 operates in response to control signals received from the Control Unit 22 over cable 36 to provide an overlap of execution of sequentially received macro instructions, all as will be described in more detail below. The Arithmetic Processor 12 receives control signals from the Control Unit 22 over cable 38 and provides branch control signals to the Control Unit 22 over cable 40.

When reference is made to cables, it should be understood that these involve wired connections, but does not necessarily imply that the wires are structurally in cables.

Functionally, the MOCU 30 is most related to the Control Unit 22, in that it performs the controlling function for macro instruction overlap, but is shown graphically separated and intermediate the Control Unit 22 and the Arithmetic Processor 12.

Figure 2:
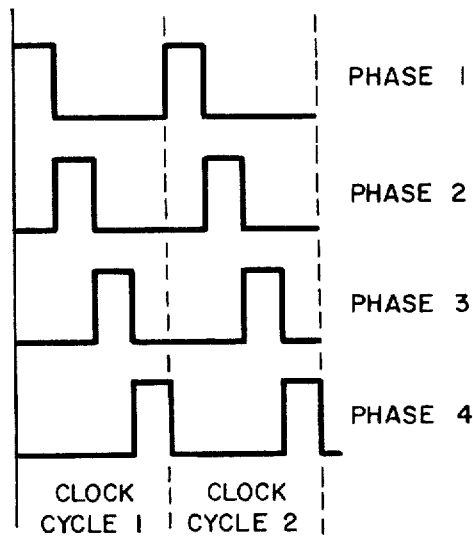
FIG. 2 defines the four phase clocking system utilized in the current invention.

The timing of the subject invention is derived from the Control Unit 22, and comprises a four phase clock, as illustrated in FIG. 2, each clock pulse having a duration of 5.5+ or −0.5 nanoseconds, and a nominal cycle of 30 nanoseconds. The timing and control provides for the execution of 1 micro instruction per clock cycle, and in the case of overlapped execution will actually result in two micro instructions for the overlapped macro instructions being executed during a clock cycle. This will be described in more detail below.

Figure 3:
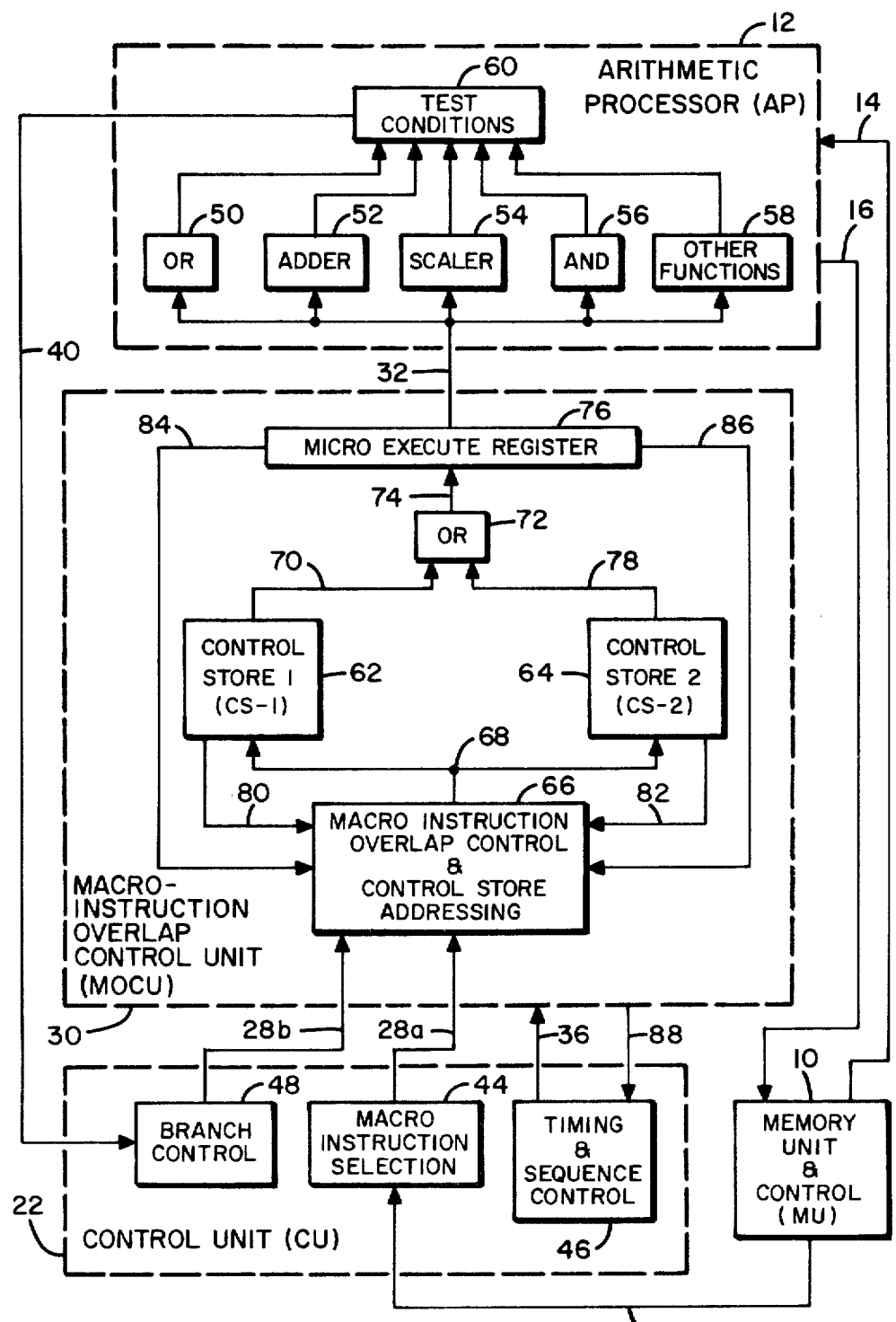
FIG. 3 is a logic block diagram of the current invention illustrating the use of parallel control store devices for storing identical sets of micro instruction related to a repertoire of macro instructions and a system for controlling the overlap of execution of macro instructions.
Figure 7C:
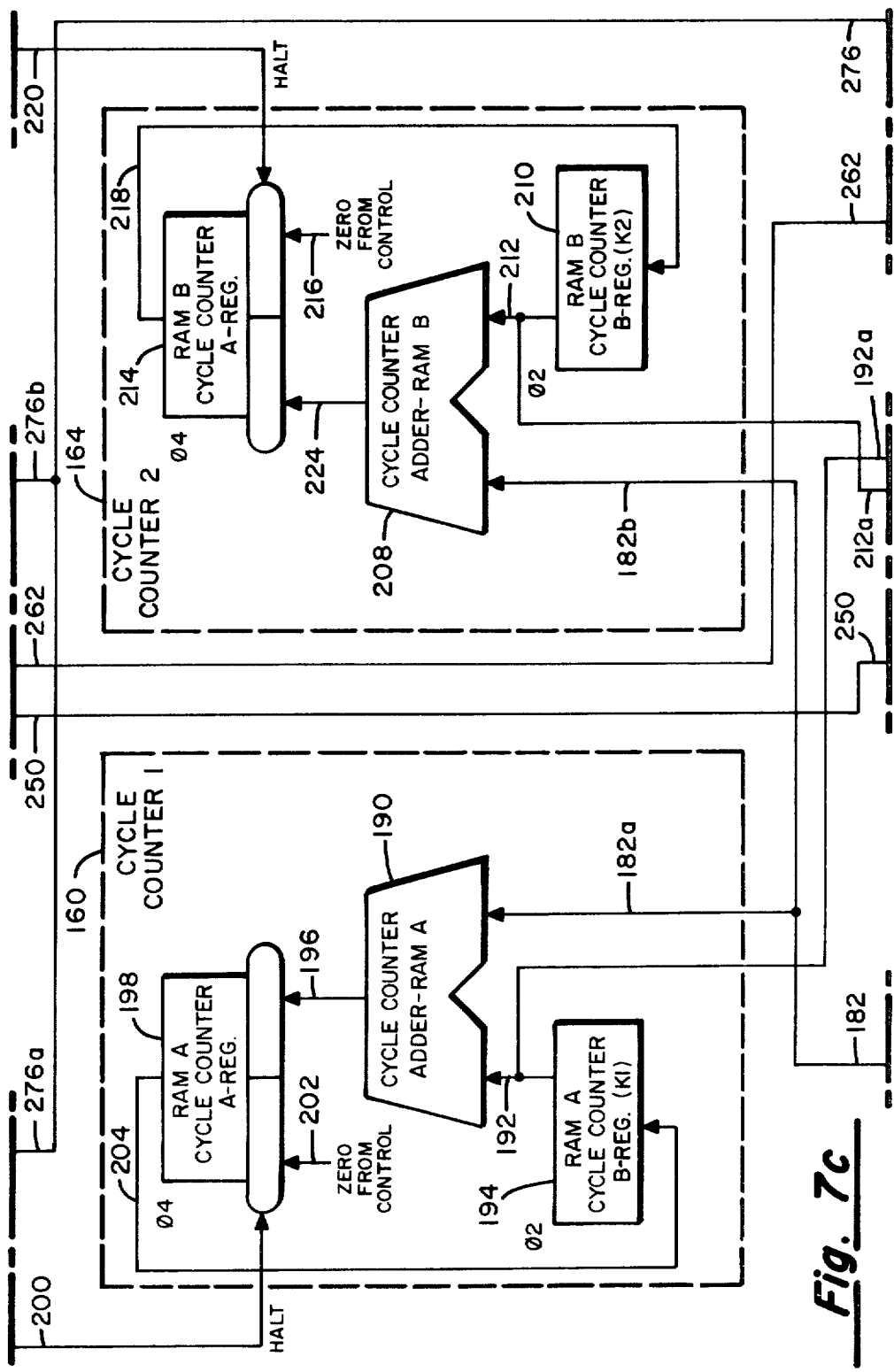
Figure 7D:
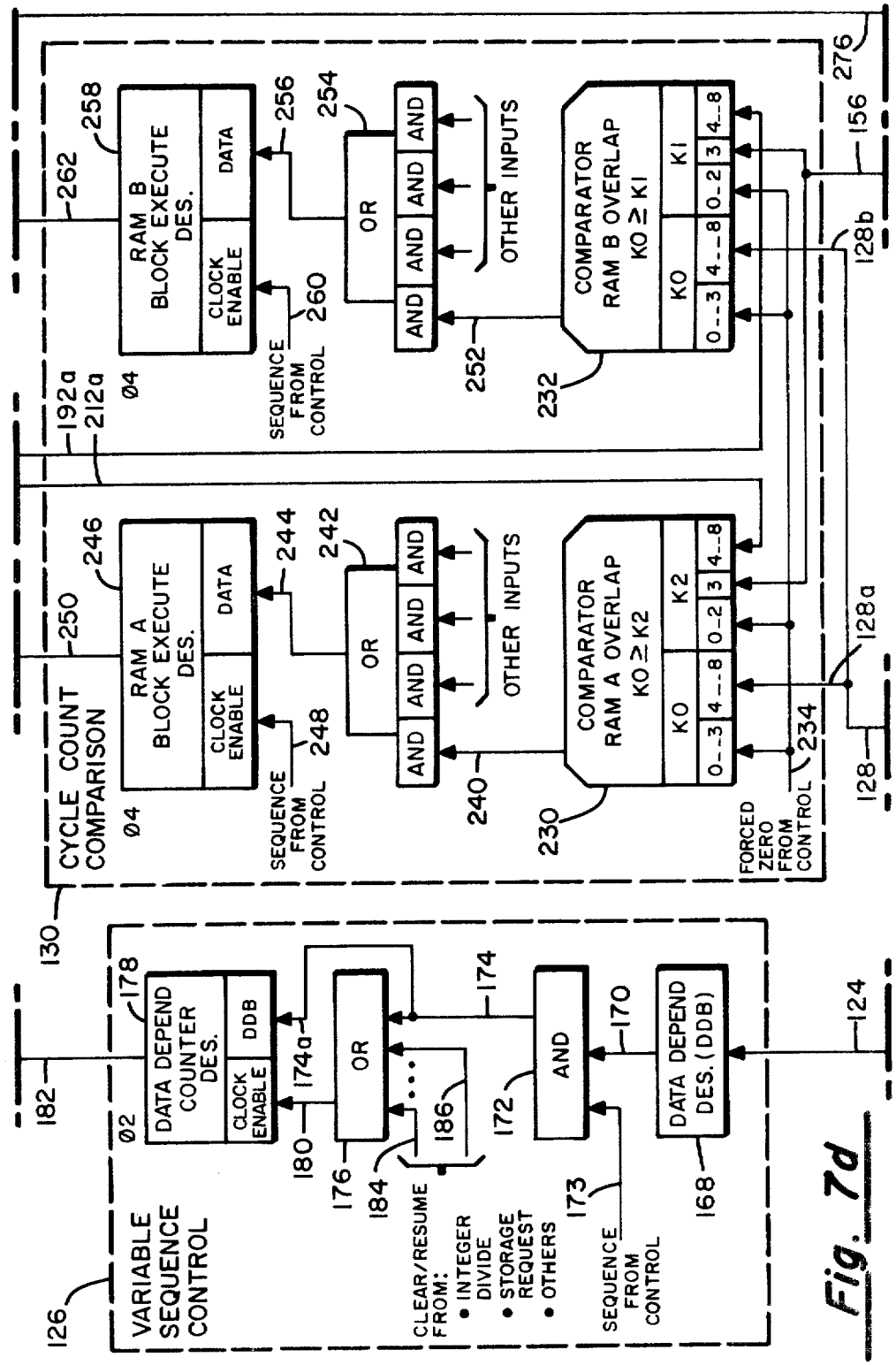
Figure 7E:
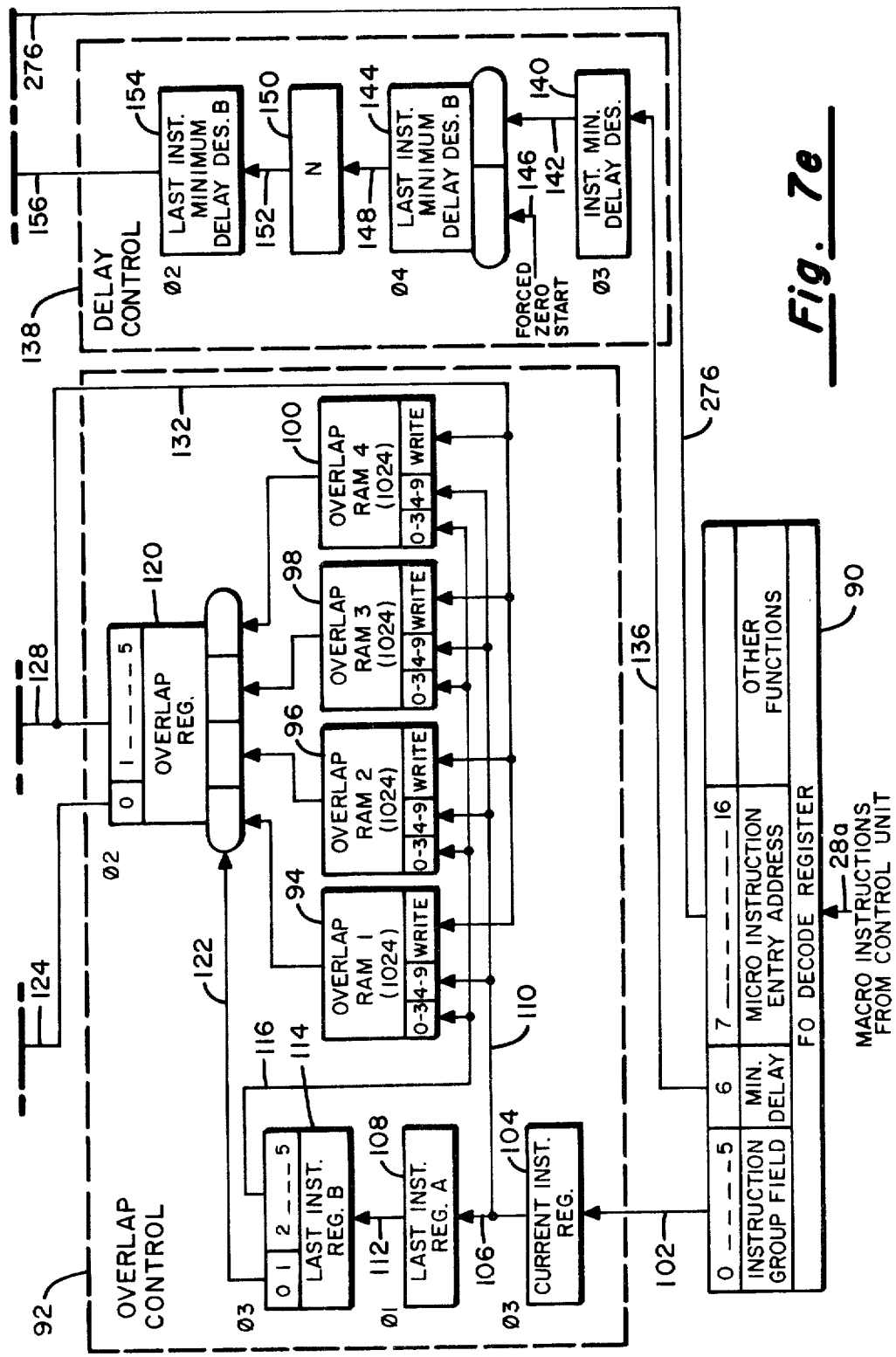

FIG. 3 is a more detailed block diagram representation of the subject invention. Elements having a function and a description similar to that previously described will bear the same reference numerals. The Memory Unit 10 is coupled to the Control Unit 22 by cable 24 and is adapted for providing macro instructions to the Macro Instruction Selection 44, which in turn provides a portion of the macro instruction over cable 28a to the MOCU 30. This will be described in more detail below. The Timing Sequence & Control 46 provides timing and control signals over cable 36 to the MOCU 30. This timing involves the clock signal, the sequence signals, and the Control Store selection signals, all as will be described in more detail below. The Branch Control 48 receives signals from the Arithmetic Processor 12 over cable 40 and indicates when branching conditions are required within the MOCU 30. The branch control signals are directed over cable 28b to the MOCU 30.

The Arithmetic Processor 12 utilizes a variety of circuits for performing the usual arithmetic and logical functions of a large scale digital processing system. Characteristically, these functions would include fixed point and floating point arithmetic operations, add, subtract, multiply, divide, scaling, logical functions, and such other functions as may be desired. To these ends, various functional circuits are included, and for sake of illustration there are shown the OR function 50, the ADDER function 52, the SCALER function 54, the AND function 56, and all OTHER FUNCTIONS 58. The Arithmetic Processor utilizes circuitry to sense such conditions as sign, insignificant zeros, magnitude, register overflow, and many other conditions well known to those skilled in the art. The various conditions that are tested often lead to branch conditions in the performance of the instructions. The output of the TEST CONDITIONS 60 is fed over cable 40 to the Branch Control 48. Function branching within the set of micro instructions normally involves the selection of an alternative sequence that must be executed when the particular branch condition is determined to exist. The addressing of the control stores and the determination of branch addressing will be described in more detail below.

The MOCU 30 includes Control Store 1 (CS-1) 62 together with Control Store 2 (CS-2) 64. CS-1 and CS-2 each include their own addressing circuitry, and each include memory devices adapted for storing the set of micro instructions for the repertoire of macro instructions. They are similarly arranged with the addresses for each set of micro instructions being the same in each control store for the sets of micro instructions. Further, each of the Control Store systems 62 and 64 include their own independent addressing circuitry and further include the cycle counter and control, all of which will be described in detail below. The Macro Instruction Overlap Control and Control Store Addressing shown in block 66 controls several operations of the MOCU 30. It receives micro instruction addresses from the Macro Instruction Selection Circuitry 44 over cable 28a and provides these addresses for initial entry into a micro instruction sequence to both CS-1 and CS-2 over lines 68. The Timing Sequence Control 46 provides an initial selection of which of the control store devices will be operative. Once the entry address for the initial instruction in the particular set of micro instructions has been set, and the sequence is allowed to proceed. CS-1 would provide the micro instruction output on cable 70 to OR circuit 72, which in turn would pass the micro instruction over cable 74 to the Micro Execute Register 76. Similarly, had CS-2 been selected by the Control Unit 22, it would have read the micro instruction over output cable 78 to OR circuit 72. The portion of the selected micro instruction read to the Micro Execute Register 76 is transmitted over cable 32 to Arithmetic Processor 12, and defines the various functions that would be performed during that particular clock cycle.

For the embodiment, the individual micro instructions are arranged to substantially provide parallel control. That is, each bit position on the micro instruction is arranged to control a particular function without further translation or decoding. That is not to say that the control function may not require further timing control, but is intended to indicate that a substantial decoding of micro instructions is not required. This should not be construed as a limitations, however, since the concept of the invention would work equally as well where decoding of the micro instruction would be required provided the micro instruction format could be arranged so that mutually exclusive control of the various functions in the Arithmetic Processor 12 could still be achieved during the overlap portion of the execution of successive pairs of micro instructions.

Each of the micro instruction words also includes a portion thereof that defines the address of the next successive micro instruction. The address of the next micro instruction is transferred from CS-1 over line 80. The address of the next micro instruction carries with it control bits for those circumstances when a branch condition could occur during the particular micro instruction. These control bits are also transferred over cable 80 from CS-1 to block 66. If the processor has determined that the particular branch condition has been satisfied, by providing a signal over cable 40 to Branch Control 48, signals will be received by block 66 over cable 28b which will indicate that the branch address rather than the specified next address will be utilized to procure the next micro instruction. The selected address will then cause the appropriate micro instruction to be read out over cable 70 to the Micro Execute Register 76. In a similar manner, the next address and branch conditions are directed over cable 82 from CS-2 to block 66. This addressing and branch control will be described in more detail.

Block 66 also includes circuitry that will evaluate the macro instruction received over line 28a in conjunction with the macro instruction that is currently in operation. Based upon the sequence of macro instructions it will select and determine whether overlap of execution will be permitted, and determine the point in the execution of the last macro instruction that the current macro instruction will be allowed to proceed. Controls will be provided to CS-1 and CS-2 over cable 68 that will indicate that both devices will be allowed to provide micro instructions over cables 70 and 78 simultaneously to OR circuits 72 for setting appropriate stages of Micro Execute Register 76.

The final micro instruction in each set of micro instructions will include a control bit position that will be known as Halt bit. The function of the Halt bit is to provide a signal out of the Micro Execute Register 76 on line 84 to block 66 that will cause the associated cycle counter to halt its counting, and on line 86 to block 66 to cause the other cycle counter to halt its counting, and to provide a signal over line 88 to the Timing Sequence Control 46 thereby advising the Control Unit that one macro instruction has been completed and that further sequencing can occur. These functional operations will be described in more detail with their associated circuits below. Similarily, the functional operation of providing for overlap of micro instructions that include a variable or data dependent portion of the sequence will be described below.

FIG. 4 illustrates the format of the macro instruction word that is applied to the MOCU 30. The conventional for bit position significance is that 0 is the highest significant digit with increasing numbers having decreasing significance. The bit positions 0 through 5 represent the Instruction Group Field, and define the particular macro instruction that is to be executed. This field is utilized for the selection of the overlap cycle count by forming a part of the addressing. As mentioned above, overlap cycle count control words are established for every sequence combination of macro instructions. The Instruction Group Field of the macro instruction that is waiting to be executed forms the least significant portion of an addressing word. When the macro instruction moves into the stage of being executed, the Instruction Group Field shifts significance and becomes the most significant part of the addressing word for the next overlap count. This will be described in more detail in the consideration of the detailed circuitry.

Bit position 6 is the Minimum Delay bit of the macro instruction word, and when set to a 0 indicates that the next macro instruction can commence immediately after the commencement of the current macro instruction. For this condition, it is unnecessary to establish an overlap cycle count because the successive macro instructions utilize completely different functions in the Arithmetic Processor 12, and can function simultaneously. Alternatively, it indicates that current instruction is capable of being executed in one clock cycle. When the Minimum Delay bit is set to a 1, it indicates to the MOCU 30 that at least one clock cycle of delay must exist before allowing the next macro instruction to proceed. This provides adequate time for the MOCU to perform the look-up of the actual overlap cycle count that must exist for the macro instruction combination.

Bit position 7 through 16 comprise the micro instruction entry address. This address designates the starting address of the set of micro instructions in CS-1 and CS-2.

The remaining n bit positions of the macro instructions are for other uses not relevant to the subject invention.

FIG. 5 defines the format of the Overlap Count Words that are established for each combination of sequences of macro instructions in the repertoire. Bit position 0 is the Data Dependent Bit (DDB). When DDB is set to a 0, it indicates that the macro instructions being started has fixed execution sequence, and overlap can be determined immediately. When DDB is set to a 1, it indicates that the instructions being started have a variable execution sequence due to data dependency. This provides for control to be exercised to inhibit the counting of execution cycles until it has been determined that the variable portion of the sequence has been completed. The DDB is utilized in the instruction sequence for the macro instruction that is being started. Bit positions 1 through 5 define the Overlap Point Cycle Count for the macro instruction sequences. Each of these words is stored in a special memory device that will be described in more detail below. It will be recalled from the discussion of FIG. 4 that Minimum Delay bit of the macro instruction word indicated that at least one clock cycle had to pass before the next instruction could proceed. This provided for the look-up of the Overlap Point Cycle Count word. The Overlap Point Cycle Count established for each sequence is actually one less cycle count than the actual cycle count permissible for overlap. This accommodates the cycle that is utilized to look-up and establish the overlap control.

FIG. 6 illustrates the format of the control words stored in the control devices, each one of such words comprising one step in the execution of the associated macro instruction. The actual micro instruction is depicted in the Micro Instruction field and is j-bits in length. It is this portion of the control word that is passed to the Micro Execute Register 76 for controlling the actual functions in the Arithmetic Processor 12 between the particular clock cycles.

The control word specifies the next address of the next control word, that is, the next micro instruction, and for this purpose has the Next Address field comprised of a-bits. For this embodiment, the Next Address field is 9-bits in length. The total address is 10-bits in length, it being understood that the lowest order bit in the address of the next micro instruction will be determined by the occurrence of a branch condition. This will be described in more detail in the construction of the detailed hardware.

Branch conditions are defined for the particular control word by the field identified as Branch Conditions, and is b-bits in length. Only one branch condition will be permissible for any particular control word, hence the Branch Conditions field will be translated in a selector such that the branch condition will be satisfied when the appropriate branching signal is received and the code translated from the Branch Conditions field indicates that it is the appropriate branch condition to be selected during this micro instruction clock cycle. For purposes of this embodiment, the Branch Conditions field will be 5-bits in length thereby yielding sufficient capacity for the selection of the particular branch condition for this micro instruction cycle. When the branch condition is found to have been satisfied, the logic circuitry, to be described below, will provide the appropriate bit setting in the lowest ordered bit position of the address of the next micro instruction for selecting the address of the micro instruction that is to occur upon satisfaction of the branching condition.

A portion of the control word is utilized for internal control of the MOCU 30, and is shown as Control field comprising k-bits. The various control signals will be described below, and for example will include a bit position indicating the completion of a set of micro instructions. This will have a bit position referred to as the Halt position and will function to turn off the appropriate cycle counter thereby indicating completion of the particular macro instructions.

In summary, then, the control word is basically made up of two types of controls, one being j-bits that are transmitted externally of the MOCU 30 for controlling the functions during the clock cycle in the Arithmetic Processor, and the balance of the control word utilized internal to the MOCU for internal control and functioning. The various interrelationships of these controls and fields will be more clearly understood when taken and considered in conjunction with the detailed circuitry that will be described below.

Figure 7:
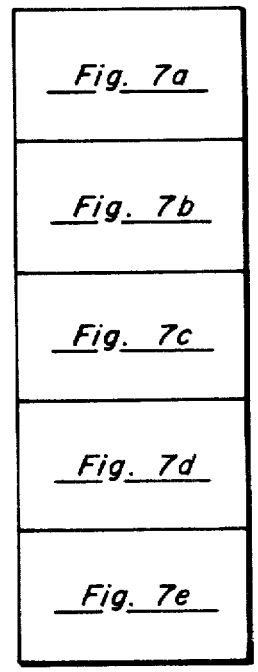
FIGS. 7a through 7e, when arranged as shown in FIG. 7, are a detailed logic diagram illustrating the circuits utilized to implement the macro instruction overlap control system.

FIGS. 7a through 7e, when arranged as shown in FIG. 7 are a detailed logic diagram illustrating the circuits utilized to implement the MOCU. All of the circuits are selected from types available in the art, and a description of their respective operation will allow those skilled in the art to select from one or more commercially available circuits, and detailed description of individual circuits is not deemed necessary and will not add to and understanding of the invention. The FO Decode Register 90 receives the macro instructions from control over cable 28a in a parallel transmission. The FO Decode Register is comprised of 17 bit-stages, each bit-stage capable of storing a single bit, plus a number of other bit-stages for uses not relevant to this invention. The fields of the marco instruction word are those previously described in conjunction with FIG. 4.

The Overlap Control is shown enclosed within block 92, and provides the function of selecting the appropriate overlap control word for the sequence of macro instructions. In the Overlap Control in this embodiment there are shown four overlap control storage devices identified as Overlap RAM 1 labeled 94, Overlap RAM 2 labeled 96, Overlap RAM 3 labeled 98, and Overlap RAM 4 labeled 100. Each RAM comprises a random access memory having 1024 addressable memory locations, each memory location capable of holding a six bit overlap control word in the configuration previously described in FIG. 5. It should be understood that the Overlap Control could utilize a single overlap RAM or could use a number other than four either greater or lesser depending on the number of instruction sequences that must be accommodated.

The Instruction Group Field is transmitted on cable 102 to the Current Instruction Register 104 and is available and stored during phase 3 of the clock cycle. The current instruction is passed on cable 106 to the Last Instruction Register A 108 and on cable 110 to Read Address positions 4 through 9 of each of the Overlap RAM devices 94, 96, 98, and 100. The signals passed on cable 110 form the least significant portion of the addressing for selecting the appropriate overlap control count. The output from the Last Instruction Register A 108 is passed on cable 112 to the Last Instruction Register B 114. Bit positions 2 through 5 of the Instruction Group Field of the last instruction are passed on cable 116 to address positions 0 through 3 for each of Overlap RAM devices 94, 96, 98, and 100. It can be seen, then, that the least significant 4 bits of the Instruction Group Field of the last instruction together with the Instruction Group Field with the current instruction form the address of the overlap count selection for determining the read addresses. It can be seen further, that the addresses are applied to all four of the Overlap RAM devices.

The output words from each of the Overlap RAM units are directed to the Overlap Register 120. The Overlap Register comprises a register that has a gated OR input such that the appropriate input is selected by the grating signals that are received on line 122 from stages 0 and 1 of the Last Instruction Register B 114. Since two bit positions of the instructions are utilized, it can select one of four inputs.

The DDB bit in stage 0 of Overlap Register 120 passes on line 124 to the Variable Sequence Control shown enclosed in dashed block 126. The count control KO passes on line 128 to Cycle Count Comparison 130. The entire output of Overlap Register 120 passes on cable 132 to the Write Circuits for the Overlap RAM units 94, 96, 98, and 100. The output on cable 132 is not utilized during normal operation and writing is inhibited. It is utilized only to change overlap control words as may be required for changes in the system arrangement, and would be done under a maintenance control procedure not relevant to this invention.

The Minimum Delay bit position from the FO Decode Register 90 is connected by line 136 to the Delay Control circuitry shown enclosed in block 138. The Minimum Delay bit of the current instruction is fed through the Instruction Minimum Delay Designator circuit 140. This circuit receives the input signal and holds it on phase three of the clock cycle. The output signal is thereafter available on line 142 as an input to the Last Instruction Minimum Delay Designator A circuit 144. These circuits are circuits of a type well known in the art and provide a temporary holding function for input signals applied to them, and may be selected from circuits available commercially. During the execution of the first macro instruction in the particular sequence of macro instructions, the Control Unit 24 has circuitry, not shown in detail, for applying a forced 0 to line 146 for forcing the Last Instruction Minimum Delay Designator A to a 0 output, thereby allowing the first macro instruction to proceed immediately. The output from circuit 144 is passed on line 148 to N circuit 150, which operates to invert the signal and pass the inverted signal on line 152 to the Last Instruction Minimum Delay Designator B 154. The output from this last circuit 154 passes on line 156 as one of the input signals to the Cycle Count Comparison circuitry 130. It will be seen, then, that on the initial instruction a 0 that is forced into the circuit 144 operates to set the Last Instruction Minimum Delay Designator B 154 to the condition that would indicate to the control circuitry that the next macro instruction can proceed immediately. This allows the first instruction to proceed immediately. Thereafter, the Minimum Delay bit of each successive macro instruction is read and saved to determine the initiation of the next subsequent macro instruction. The functioning of the Delay Control circuitry 138 will become clear in consideration of the Cycle Count Comparison circuitry 130 which will be described in more detail. As previously mentioned, the Minimum Delay functions to provide one clock cycle time to perform the look-up of the overlap control word by the Overlap Control circuitry 92 for purposes of determining the actual number of cycles that must elapse before overlap of instructions can occur.

Cycle Counter 1 shown enclosed in dashed block 160 controls the counting of the number of cycles of execution of micro instructions during fixed sequence operation of the Control Store 1 shown enclosed in dashed block 162. Similarly, Cycle Counter 2, shown enclosed in dashed block 164 counts the number of micro instruction executions for Control Store 2, shown enclosed in dashed block 166. It will be recalled that one micro instruction is executed each clock cycle, hence Cycle Counter 1 and Cycle Counter 2 can each be incremented once each clock cycle provided the last instruction is not of a variable sequence variety. It will be recalled that the cycle counters are inhibited from advancing in those situations when the last instruction is in the variable portion of the sequence. The Variable Sequence Control, shown enclosed in block 126 provides the control of the cycle counters both for advancement during fixed sequence cycles and for inhibiting advancement during the variable sequence portion of the instruction.

The Variable Sequence Control receives the Data Dependent Bit (DDB) from the 0 bit position from the Overlap Register 120 via line 124, and when in the one condition thereby indicating a variable sequence, operates to set the Data Dependent Designator 168. The DDB passes on line 170 to AND circuit 172. When the Sequence signal is available from Control Unit on line 173 from control circuitry (not shown) DDB passes to OR circuit 176 and on 174a to the DDB input of the Data Depend Counter Designator 178. The the output of OR circuit 176 provides a signal on line 180 to the Clock Enable of the Data Depend Counter Designator. Occurence of a 0 DDB results in a signal on output lines 182 that allows advancement of the cycle counters each clock cycle since the 0 indicates that the sequence is not data dependent and is not variable. Alternatively, the occurrence of a 1 DDB results in the output signal of line 182 being held in a condition that inhibits the advancement of the cycle counters. Once counting is inhibited, it is not allowed to progress until the Variable Sequence Control receives signals from the data processing system that the particular condition of the variable sequence has been satisfied. For example, the integer divide sequence is variable, and once past the variable portion of the sequence will provide a signal on line 184 to switch OR circuit 176. This will effectively disable the clock enable and switch the Data Depend Counter Designator 178 to provide a signal on line 182 that allows counting to advance. Similarly, when a storage request has been satisfied, a Clear/Resume signal will be received on line 186 and the same sequence will repeat. It can be seen, then, OR circuit 176 is arranged to receive input signals from all of the variable sequence conditions in the data processing system and operates such that so long as all inputs thereto are in the disabled state the Data Depend Counter Designator 178 will cause advancement of the cycle counters to be inhibited. The occurence of a Clear/Resume on any input to OR circuit 176 will cause the counting to advance on a cycle by cycle basis. It should be noted, that only one variable sequence condition will prevail for a particular Data Dependent Bit condition.

The Cycle Counter 1 shown enclosed in dashed block 160 includes a Cycle Counter Adder-RAM A that is an adder of the type known in the art of a capacity that will provide a sum that is at least 5 bits in capacity, and provides a sum K1, the circuit labeled 190. Adder 190 receives one input on line 182a which comprises the signal to add one, or not add one to the operand received on line 192 from the RAM A Cycle Counter B-Register 194. The sum is provided on line 196 to the RAM A Cycle Counter A-Register 198. This register also receives a control signal on line 200 and forced 0's from the Control Unit on line 202. The control signal on line 200 is the Halt signal that will be described in more detail below, and when the Halt signal is present, operates to enable the forced 0 for clearing the RAM A Cycle Counter A-Register 198. The absence of the Halt signal operates to allow the sum transmitted on line 196 to be set into Register 198. The output from Register 198 passes on line 204 during phase four of the clock cycle as an input to set RAM A Cycle Counter B-Register 194, whereby the count K1 is available during phase two of the clock cycle as an output therefrom. This output is provided on line 192 as one of the operand inputs to the Cycle Counter Adder-RAM A 190, and is also provided as a set of input signals on line 192a to the Cycle Count Comparison circuitry 130.

The Cycle Counter 2, shown in dashed block 164 has similar components and similar operations including the Cycle Counter Adder-RAM B, 208, which forms the sum of the advance count received on line 182b, and the operand received from the RAM B Cycle Counter Register 210 over cable 212. The contents of this register comprises the cycle count K2 which in turn is provided as an input on cable 212a as an input to the Cycle Count Comparison circuitry 130. The RAM B Cycle Counter A-Register 214 receives the output from the adder 208 on cable 216 and provides this output on cable 218. The Halt signal is received on line 220 and the forced 0 input is received on line 224 for clearing the RAM B Cycle Counter A-Register 214.

The Cycle Count Comparison circuitry 130 basically operate to perform the comparison of the two cycle counts K1 and K2 versus the controlling cycle count K0 received from the Overlap Register 120. The Comparator RAM A Overlap 230 and the Comparitor RAM B Overlap 232 are each comparator circuits that are available commercially, and provide the comparison of two 9 bit operands. The cycle counts K1 and K2 and the overlap control count K0 are each 5 bits in capacity, and the additional 4 bits are provided simply to illustrate that the count capacity may be larger than that described for this embodiment. Further, the Delay Control 138 utilizes an additional bit position, the right bit number 3 position of each, for forcing a known comparison output for causing the delay of a minimum of one clock cycle. The output from the Overlap Register 120 is transmitted on cable 128a to bit positions 4 through 8 of the K0 portion of comparator 230 and over lines 128b to bit positions 4 through 8 of the K0 portion of comparator 232. Since they are not utilized for this embodiment, 0 signals are forced from the control unit by circuits (not shown) over lines 234 to the 0 through 3 bit positions of the K0 portion of Comparator 230 and 232, and to bit positions 0 through 2 of the K2 portion of Comparator 230 and the 0 through 2 bit positions of the K1 portion of Comparator 232. The cycle count K1 is connected through cable 192a to the 4 through 8 bit positions of the K1 portion of comparator 232. Similarly, the output from Cycle Counter 2 comprising the K2 count passes over cable 212a to the bit positions 4 through 8 of the K2 portion of Comparator 230. The Minimum Delay bit selection is provided at the output of the Delay Control on line 156 and is provided as an input to the 3 bit position of the K1 and K2 portions of Comparators 232 and 230 respectively. Comparator 230 provides an output on line 240 to AND-OR circuit 242, the signal being essentially a blocking signal while the count comparison is determined to satisfy the conditions that count K0 is greater than cycle count K2. The signal from AND-OR 242 passes as an input over line 244 to set the RAM A Block Execute Designator 246. Circuit 246 is a latching circuit of the type well known in the art, and is caused to be set to the blocking state and held in that condition upon receipt of a sequence signal from the Control Unit from circuitry, not shown, on line 248, and when set provides a blocking output signal on line 240. The usage of the blocking signal will be described in more detail below. When the Comparator RAM A Overlap 230 determines that K2 is equal to or greater than K0, the signals provided on line 244 will clear the blocking conditions of the RAM A Block Execute Designator 246, and the signals on line 250 will be an enabling signal rather than blocking signal. The functioning of Comparator RAM B Overlap 232 and its associated circuitry is similar to that just described, the difference being that the comparison is to the value of the control overlap count K0 versus the cycle count K1. When Comparator 232 determines that K0 is greater than the overlap count K1, a signal is provided on line 252 to the AND-OR circuit 254 which in turn provides its signal on line 256 to control the operation of the RAM B Block Execute Designator 258. When the sequence signal is received on line 260 from the Control Unit the blocking signal is available on line 262 until such time as Comparator 232 determines that the condition is satisfied that K1 is equal to or greater than K0, at which time the blocking signal is removed and an enabling signal is available.

The control store devices 162 and 166 are similarly configured, each of them being arranged to store the sets of micro instructions for performing each of the macro instructions in the repertoire, together with the micro code control signals necessary for the internal operational control. The RAM A Micro Code Storage 270 and the RAM B Micro Code Storage 272 are each random access memory devices available as commercial components, and each includes the addressing and reading circuitry and associated writing circuitry. The capacity is such that a 10 bit address is utilized for addressing the storage location therein. The micro instructions and the micro control portions of each of the addressable locations is that previously described with FIG. 6.

The Address Register RAM A 274 is the address storage register for RAM A 270. It is a ten stage register having alternative gated sources of the address signals. When each set of micro instructions is initiated, an entry address is received from the F0 Decode Register 90 on line 276a. This entry address is applied to Address Register RAM A 274 on line 276a, and is applied to Address Register RAM B 278 on line 276b. The Control Unit will select by circuitry (not shown) which of the control devices will be activated for that particular set of micro instructions. These select signals are applied to the Address Register RAM A on line 280, and to the Address Register RAM B on line 282. The address registers are also gated by the output of the appropriate Block Execute Designator 246 and 258. The blocking signal is applied on line 250a to the Address Register RAM A and the blocking signal is applied to Address Register RAM B on line 262a the address for RAM A is applied on line 286 to the addressing circuitry, and on the appropriate phase of the clock causes the addressed micro code to be read out. The address for the next micro code word will be determined from the portion of the micro code word by looking at the Next Address field and the Branch field. The Next Address comprises a bits and for this embodiment is 9 bits, and passes on line 288 to the RAM A Next Address Register 290. These 9 bits comprise the most significant portion of the address of the next instruction, with the addressing information passing on line 292 as an input to the Address Register RAM A 274. If no branch condition exists, the address is shown in the RAM A Next Address Register 290 comprises the entire address and the least significant digit will be forced to 0. If a branch condition exists, the least significant digit will be forced to a 1 and the alternative addresses are thereby achieved. The condition of branching is selected by the output on line 294 which controls the RAM A Branch Designator 296. This circuit is a gate array that receives all branch conditions signals on lines 28b from the Control Unit. In this configuration the Branch field is b bits and b is 5 for this embodiment. Therefore, the RAM A Branch Designator selects an output for line 298 when the branch condition defined by the 5 bit code is present on the input.

The arrangement is the same for RAM B, with the Address Register RAM B providing the addressing information on line 300 for selecting the address to be read out. The Next Address of the instruction read out is available on line 302 as an input for the RAM B Next Address Register 304 which provides a 9 bit addressing code on line 306 as an input back to the Address Register 278. The Branch field passes on line 308 as the selecting code to the RAM B Branch Designator 310, which in turn provides a signal on line 312 when the selected branch condition is also present as an input.

The Micro Instruction Execute Register 320 is j bits in capacity, and provides two gated OR inputs for each stage. The gating is shown by the two AND circuits. The micro instructions from RAM A is received on line 322, and is either blocked or gated depending upon the output from RAM A Block Execute Designator on line 250b. When gated, the contents of the micro instruction set associated stages of the Micro Instruction Execute Register 320. In a similar manner the micro instruction read from RAM B on line 324 is fed to the same register. The gating signal or blocking signal from RAM B Block Execute Designator on line 362b determines whether or not the particular micro instruction will be gated into the Micro Instruction Execute Register. Unless overlap is occurring, only one of the two possible micro instructions will be gated into this register. However, during the overlap operation both micro instructions are gated into the Micro Instruction Execute Register 320. The following example illustrates the determination of the output signals that will be available on line 330 to the Arithmetic Processor, where, for this example, it is understood that a 0 in the output denotes that the particular function controlled by these stages of the micro instruction is not activated, and a 1 indicates that the associated function is activated. The first line of the following example defines the register stages for the j bit capacity. The second two lines represent micro instructions read from RAM A and RAM B respectively. The output will include a 1 for each stage in which there is a 1 in either the instruction received from RAM A or RAM B.

| 0 | 1 | 2 | 3 | 4 | 5 | 6 | 7 | ... | j | Register Stages |
|---|---|---|---|---|---|---|---|-----|---|-----------------|

-continued

| 1 | 0 | 0 | 1 | 1 | 0 | 0 | 0 | ... | 1 | RAM A |
|---|---|---|---|---|---|---|---|---|---|---|
| 0 | 1 | 0 | 0 | 0 | 0 | 1 | 0 | ... | 0 | RAM B |
| 1 | 1 | 0 | 1 | 1 | 0 | 1 | 0 | ... | 1 | Output |

It can be seen that for overlap operations to be performed, the functions controlled by each of the stages in the micro instructions that are to be activated must be mutually exclusive, or the processor would be attempting to perform similar functions for two different macro instructions at the same time.

The Control field of RAM A is passed on line 332 to the RAM A Micro Control Register 334. The Control field is k bits and stores internal control signals for the system. For example, the last micro instruction in the set of micro instructions for a macro instruction will be known as the Halt bit and will pass on line 200 to Cycle Counter 1. The input to this register 334 is also gated or blocked by the signal received on line 250c. The RAM B Control field passes on line 336 to the RAM B Micro Control Register 338, and causes setting of this register when gated by the signal on line 262c.

Throughout the description there has been reference to the clocking by reference to the clock phases. The clocking is shown in the circuit diagram by the representation of $\phi$ followed by a number indicitive of the clock phase that controls the circuit. It is understood and clear to those skilled in the art without showing wired connections how the clocking as defined by each clock circuit is accomplished.

SYSTEMS OPERATION

Figure 8A:
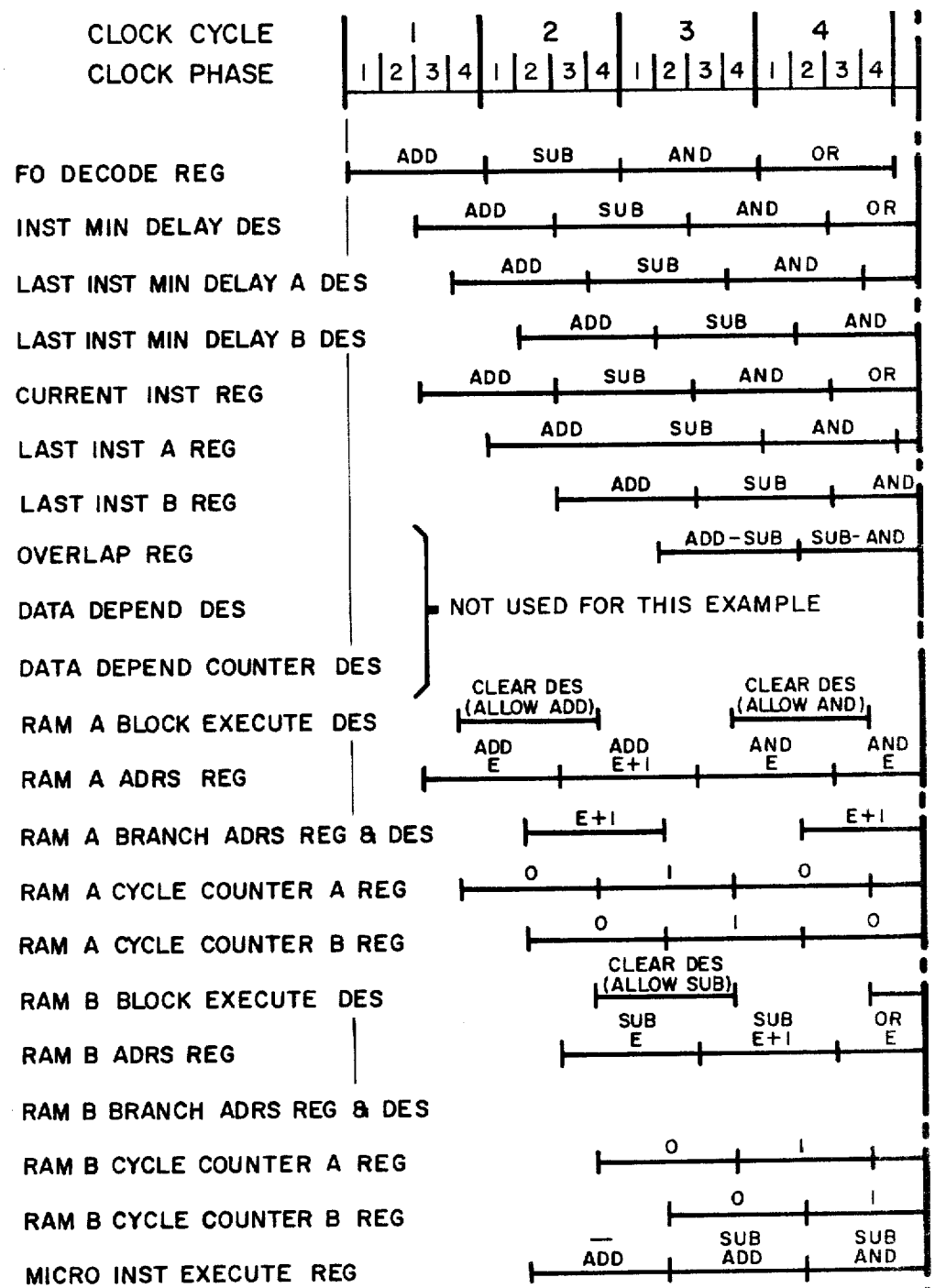
FIG. 8a and FIG. 8b, when arranged as shown in FIG. 8, is a timing example of a sequence of macro instructions where no minimum delay and no data dependency is utilized.
Figure 8B:
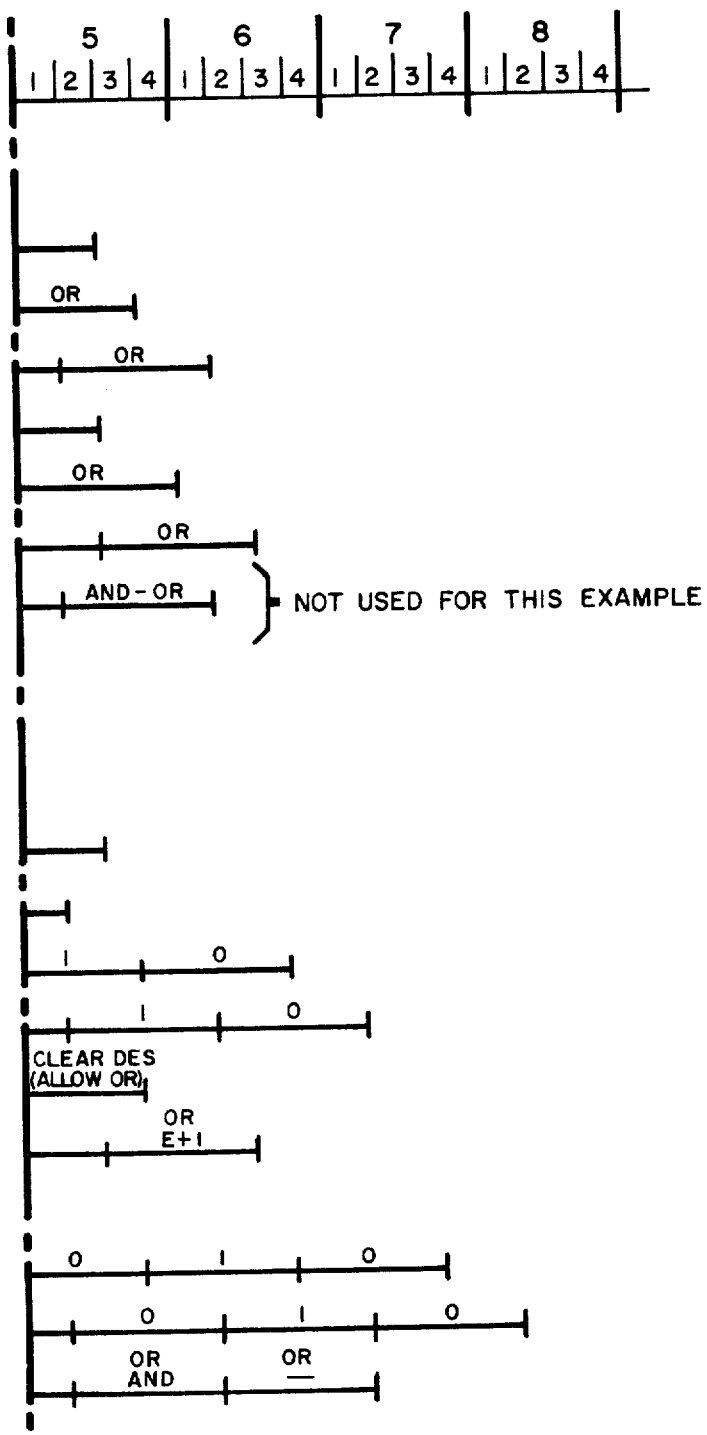
Figure 9A:
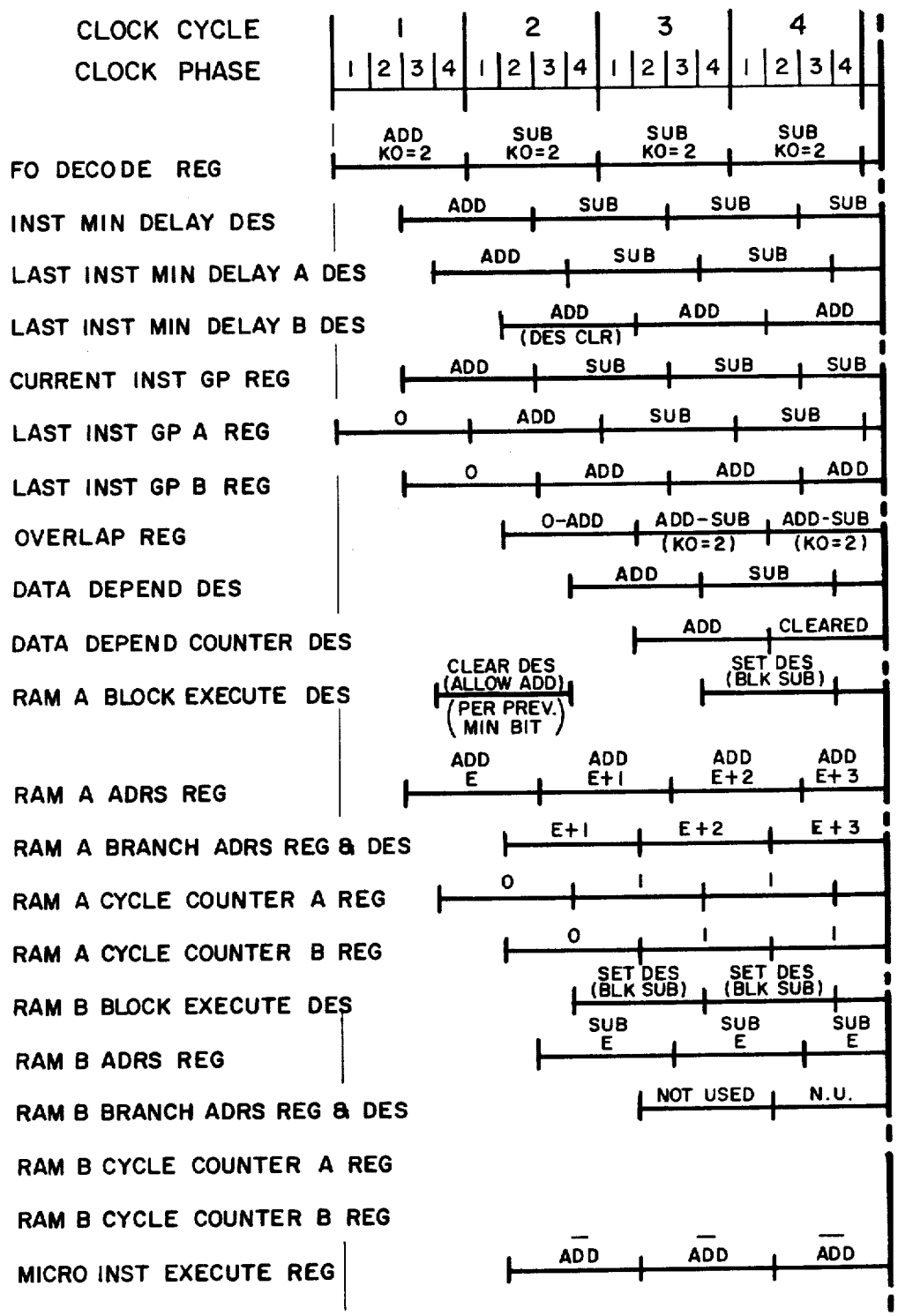
FIGS. 9a through 9d, when arranged as shown in FIG. 9, is a timing example of a sequence of instructions that utilizes minimum delay requirements and involves an example of data dependency.
Figure 9B:
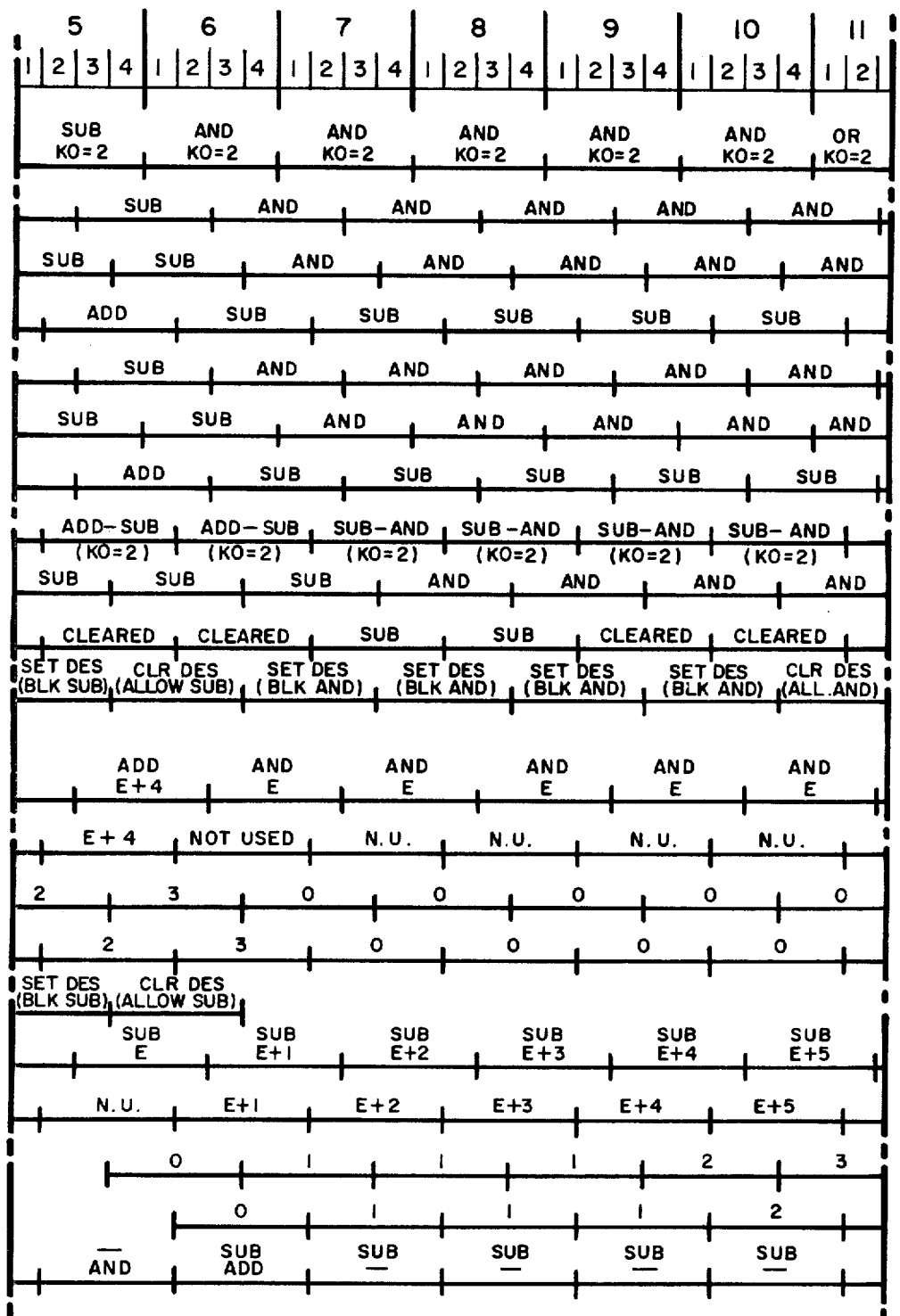
Figure 9C:
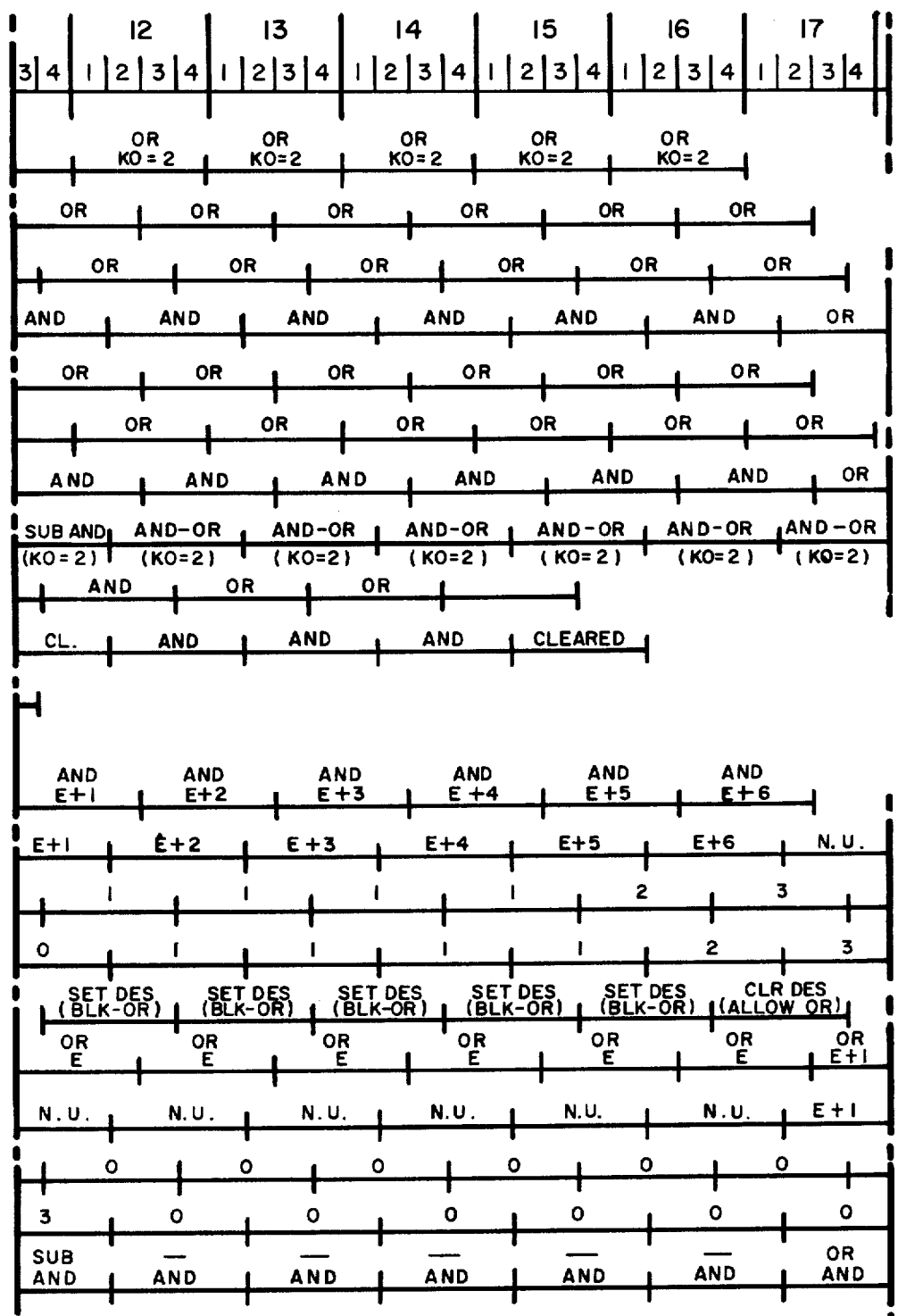
Figure 9D:
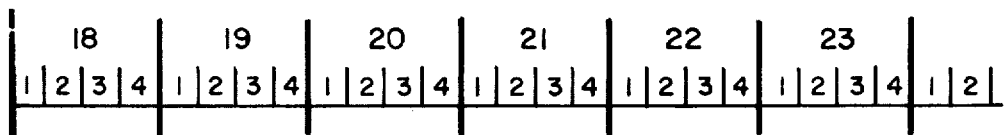
Figure 9D:
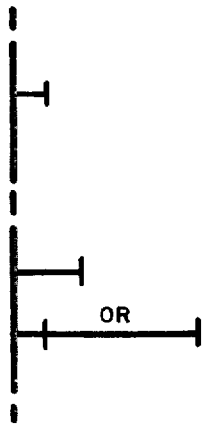
Figure 9D:
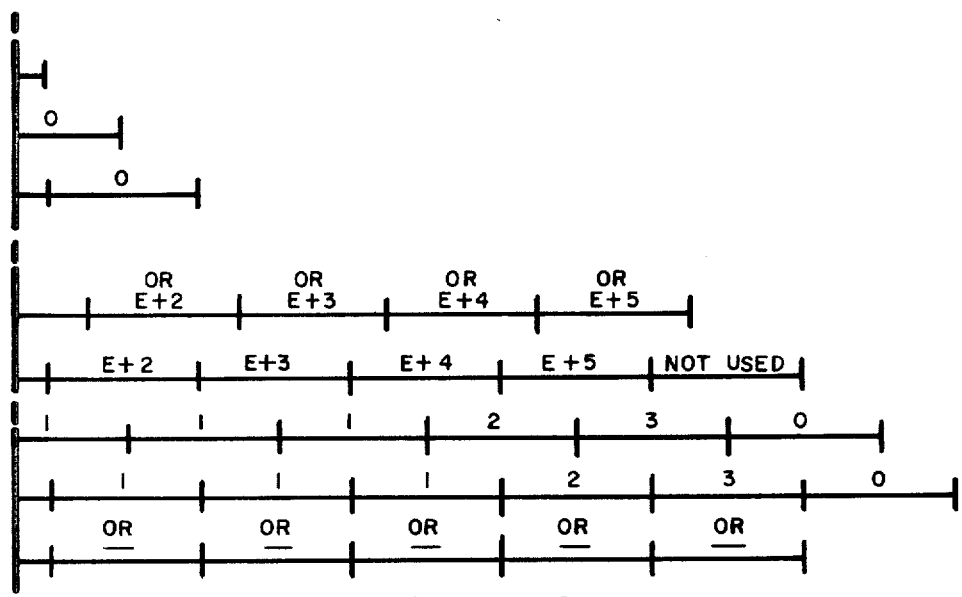

Having considered the detailed circuitry and the functional relationship of the circuit elements, the following descriptions and applications of examples will further assist in an understanding of the operation. FIG. 8a and FIG. 8b when arranged as shown in FIG. 8 is a sequence timing example for a sequence of macro instructions that involve an ADD, SUBTRACT, AND, and OR macro instructions. This example is a simple example in that for the types of instructions described, the Minimum Delay bit in each of the macro instructions is a 0 indicating that one instruction can follow the next instructions immediately. Further, there is no use of the Data Dependent Bit (DDB) in the overlap control word so that the functions are fixed and not data dependent. Further, there is no variable sequence involved. A consideration of the example illustrated in FIG. 8a and FIG. 8b will include a reference to the registers and designators previously described.

The entry address E is available at clock phase three of cycle one, and the next RAM A address E+1 is available at phase three of clock cycle two. As previously described, the next address from each of the control stores is selected by the Next Address field, and may not be the next sequential addressable location. The notation E+1 simply denotes that it is the next instruction address.

This example also assumes that the Control Unit has selected CS-1 to commence the ADD INSTRUCTIONS.

The functioning of the Cycle Counters is also graphically shown, as is the clearing and setting of the blocking designators.

The result is shown at the Micro Instruction Execute Register where it is depicted that the ADD INSTRUCTION is executed commencing on clock phase two of cycle two and end at clock phase one of cycle four. The SUBTRACT INSTRUCTION overlaps the ADD INSTRUCTION commencing at clock phase two of clock cycle three. The AND INSTRUCTION overlaps the SUBTRACT INSTRUCTION commencing at clock phase two of cycle four. And finally, the OR INSTRUCTION overlaps the AND INSTRUCTION commencing at clock phase two of cycle five.

A relatively more complex example is shown in FIG. 9a through 9d, when arranged as shown in FIG. 9. This example again contemplates a sequence of instructions of an ADD INSTRUCTION, SUBTRACT INSTRUCTION, AND INSTRUCTION, OR INSTRUCTION. This example contemplates that the particular instructions will utilize the Minimum Delay bit selection for purposes of allowing the look-up of the overlap count K0.

For purposes of this example, it is established that at least three cycles, that is three micro instructions, must be executed, before any overlap can be permitted. Accordingly, K0 is two for each of these overlap sequences.

This example also indicates that the DDB is utilized as can be seen from the line depicting the Data Depend Counters Designator.

As previously described, the control store addressing refers to the entry address E and thereafter the entry address plus a specified number of counts. It should be understood that this does not contemplate the number of sequential addressable locations, but again simply refers to the addressing as determined from the micro control word. It is of course clear to those skilled in the art that program address counters could be utilized rather than having the addresses stored with the control words, but this embodiment for the sake of flexibility prefers the use of stored addresses.

These examples when taken in conjunction with the detailed description of the circuitry and its operation, clearly indicates that the purposes and objectives of the invention have been met.

What is claimed is:

1. In a digital data processing system having an instruction repertoire including a plurality of macro instructions which can be programmed and executed in desired sequences, and each macro instruction execution is under the control of one or more pre-stored micro instructions, each of said pre-stored micro instructions for controlling a predetermined portion of the execution of the macro instruction, macro instruction overlap control apparatus comprising:
  first and second control store means, each adapted for storing the sequences of micro instructions for controlling the execution of the repertoire of macro instructions;
  macro instruction execution overlap control means coupled to said first and second control store means for controlling the overlap of execution of sequentially received macro instructions; and
  micro instruction execute means coupled to said first and second control store means and said macro instruction execution overlap control means for combining micro code instructions for simultaneous execution to effect overlap of execution of associated macro instructions.

2. A macro instruction overlap control apparatus as in claim 1 wherein said first and second control store means each include
  addressable random access memory means; and address register means coupled to said random access storage means for providing addresses for controlling the read out of micro instructions.

3. A macro instruction overlap control apparatus as in claim 2 wherein each of said first and second control store means further includes branch control means for altering the sequence of execution within the set of micro instructions in response to associated external control conditions.

4. A macro instruction overlap control apparatus as in claim 3 wherein each of said first and second control store means further includes entry address means coupled to said address register means for providing the entry addresses to said address register means for the sets of micro instructions to perform associated macro instructions.

5. A macro instruction overlap control apparatus as in claim 1 wherein said macro instruction execution overlap control means includes overlap control count storage means adapted for storing control count words for each sequence of macro instructions in the repertoire of instructions for determining the number of micro instructions of the macro instructions in operation that must be completed before the next sequential macro instruction can be allowed to proceed.

6. A macro instruction overlap control apparatus as in claim 5 wherein said macro instruction overlap control means further includes last macro instruction group and current macro instruction group combining means coupled to said overlap control count storage means for selecting the overlap control counts for the sequences of macro instructions.

7. A macro instruction overlap control apparatus as in claim 6 wherein said macro instruction overlap control means further includes:
cycle counter means for counting the number of micro instructions executed; and
cycle count comparison means coupled to said cycle counter means and said overlap count control storage means for comparing said control count words to the counts of execution of micro instructions for providing enabling signals to said micro instruction execute means when said control count words have a predetermined relationship to the number of micro instructions executed, thereby providing for simultaneously executing micro instructions for the last macro instruction and the current macro instruction.

8. A macro instruction overlap control apparatus as in claim 7 wherein said macro instruction execution overlap control means further includes variable sequence control means having data dependency receiving means for receiving signals indicating that the related macro instruction is of a variable sequence dependent upon the data, and having a means for receiving signals indicative that the variable portion of the sequence has been completed, said variable sequence control means coupled to said cycle counter means for inhibiting advancement of cycle count until the end of variable sequence signal has been received.

9. A macro instruction overlap control apparatus as in claim 7 and further including macro instruction completion means coupled to said cycle counter means of providing halt signals at the completion of each of said macro instructions.

10. A macro instruction overlap control apparatus as in claim 7 and further including delay control means coupled to said cycle count comparison means for alternatively providing an enable signal to allow the next macro instruction to proceed immediately or a disable signal indicative that at least one cycle of the macro instruction in operation must be completed before the next macro instruction can commence thereby allowing time for the actual one of said control count words to be selected and made available to said cycle count comparison means.

11. A macro instruction overlap control apparatus as in claim 7 wherein said cycle counter means includes a first cycle counter for providing first counts from counting micro instruction executions from said first control store means, and a second cycle counter for providing second counts from counting micro instruction executions from said second control store means; and
said cycle count comparison means includes first comparison means for comparing said control count words to said first counts and providing first ones of said enabling signals where a predetermined relationship exists, and second comparator means for comparing said control count words to said second counts and providing second ones of said enabling signals when said predetermined relationship exists.

12. A macro instruction overlap control apparatus as in claim 11 wherein each of said control count words is of a value of one less than the actual number of micro instructions that must be executed before overlap of execution of macro instructions can proceed, and said predetermined relationship is one of equality.

13. In a digital data processing system having an instruction repertoire including a plurality of macro instructions which can be programmably selected and sequenced, wherein the execution of each macro instruction is under the control of a predetermined associated set of micro instructions, each of said micro instructions for controlling a predetermined portion of the execution of the macro instructions, a main memory device for storing data words and programmed macro instructions in a sequence for operation, and an arithmetic processor for executing the programmed sequence of macro instructions in accordance with the sets of micro instructions associated with each of said macro instructions, and control apparatus coupled to said main memory device and for providing timing and control signals, macro instruction overlap control apparatus coupled to said control apparatus and said arithmetic processor comprising:
first and second addressable control store means, each adapted for storing the sets of micro instructions for controlling the execution of the repertoire of macro instructions;
input means for providing a first group of signals indicative of the macro instructions to be executed, and coupled to said first and second addressable control store means for providing a second group of signals indicative of the entry addresses in said first and second addressable control store means for the set of micro instructions associated with said macro instructions;
overlap control means coupled to said input means and including addressable overlap control count storage means adapted for storing control count words for each sequence of macro instructions in the repertoire of the instructions of the macro instructions defining the operations that must be completed before the next sequential macro instruction can be allowed to proceed, and and macro instructions sequence determining means coupled to said input means for providing macro instructions sequence determining signal for addressing said overlap control count storage means;

cycle counter means coupled to said first and second addressable control store means for counting the number of micro instructions executed and providing a first cycle count in relationship to said first addressable control store means and a second cycle count in relationship to said second addressable control store means;

micro instruction execute means coupled to said first and second addressable control store means for providing micro instructions to said processor, including a gate means for receiving enabling gate signals for controlling loading of said micro instructions execute means from said first addressable control store means, or said second addressable control store means, or both said first and second addressable control store means;

cycle count comparison means coupled to said cycle counter means and said overlap count control storage means for comparing said control count words to the count of execution of micro instructions for the one of said first and second addressable control store means in control of macro instructions operation for providing said enabling gate signals to said micro instruction execute means when said control count words have a predetermined relationship to the number of micro instructions executed, thereby providing for simultaneously executing micro instructions for the last macro instruction and the current macro instruction.

14. A macro instruction overlap control addressable apparatus as in claim 13 wherein said first and second control store means each include addressable random access storage means comprised of a plurality of addressable storage locations, each of said addressable storage locations including j bits for the storage of a micro instruction, a bits for the storage of the address of the next micro instruction, b bits for the storage of signals indicative of branch condition that may be applicable to the associated macro instruction, and k bits for internal control; and address register means coupled to said random access storage means for providing addresses for controlling the read out of micro instructions, the initial address provided by said second group of signals indicative of the entry addresses, and thereafter sequentially from the a bit next address field in conjunction with the b bit branch designation field of the current micro instruction.

15. A macro instruction overlap control apparatus as in claim 14 wherein each of said first and second addressable control store means further includes branch control means responsively coupled to receive b bits read with the current micro instruction and adapted to receive branch condition signals from external sources for altering the address of the next micro instruction when branch conditions are satisfied for altering the sequence of execution within the set of micro instruction in response to said external branch control conditions.

16. A macro instruction overlap control apparatus as in claim 15 and further including control store selection means for receiving selection signals for causing said first and second addressable control store means to alternately control macro instruction execution.

17. A macro instruction overlap control apparatus as in claim 16 and further including variable sequence control means having data dependency receiving means for receiving signals indicating that the related macro instruction is of a variable sequence dependent upon the data, and having a means for receiving signals indicative that the variable portion of the sequence has been completed, said variable sequence control means coupled to said cycle counter means for inhibiting advancement of cycle count until the end of variable sequence signal has been received.

18. A macro instruction overlap control apparatus as in claim 17 and further including macro instruction completion means coupled to said cycle counter means of providing halt signals at the completion of each of said macro instructions.

19. A macro instruction overlap control apparatus as in claim 17 and further including delay control means coupled to said cycle count comparison means for alternatively providing an enable signal to allow the next macro instruction to proceed immediately or a disable signal indicative that at least one cycle of the macro instruction in operation must be completed before the next macro instruction can commence thereby allowing time for the actual one of said control count words to be selected and made available to said cycle count comparison means.

20. A macro instruction overlap control apparatus as in claim 16 wherein said cycle counter means includes a first cycle counter for providing first counts from counting micro instruction executions from said first control store means, and second a second cycle counter for providing second counts from counting micro instruction executions from said second control store means; and said cycle count comparison means includes first comparator means for comparing said control count words to said first counts and providing first ones of said enabling signals where a predetermined relationship exists, and second comparator means for comparing said control count words to said second counts and providing second ones of said enabling signals when said predetermined relationship exists.

21. A macro instruction overlap control apparatus as in claim 20 wherein each of said control count words is of a value of one less than the actual number of micro instructions that must be executed before overlap of execution of macro instructions can proceed, and said predetermined relationship is one of equality.

22. A macro instruction overlap control apparatus as in claim 16 wherein said overlap control means includes a plurality of addressable random access storage devices for storing said control count words, and selection means coupled to said macro instructions sequence determining means for selecting the one of said plurality of addressable random access storage devices from which to read the related one of said control count words.

23. In a digital data processing system having a data processor unit for executing programmed ones of a repertoire of macro instructions, each macro instruction defined by an associated set of micro instructions for controlling the functions of the data processor, a main memory unit for storing macro instructions and data words, a control unit intermediate the data processor unit and main memory unit for controlling transfer of programmed macro instructions and data words and providing timing for execution of one micro instruction per clock cycle and control signals, said control unit including macro instruction overlap control apparatus comprising:

first and second addressable control store means, each adapted for storing all of the sets of micro instructions associated with the executions of the repertoire of macro instructions;

first input means for receiving instruction signals indicative of the macro instruction to be executed;

second input means coupled to said first and second addressable control store means for receiving address signals indicative of the entry address of the set of micro instructions associated with said macro instructions to be executed, and applying said address signals to said first and second addressable control store means;

third input means coupled to said first and second addressable control store means for receiving control signals for selectively activating one of said first and second addressable control store means for executing a macro instruction;

overlap control means including addressable overlap control count storage means adapted for storing control count words for each sequence of occurrence of macro instructions defining the number of micro instructions of the then current macro instruction that must be executed before the next macro instruction can commence, each of said control count words including a data dependency indicating bit for providing data dependency indicating signals indicating whether the first macro instructions in the sequences of macro instructions are variable in the number of micro instructions sequences depending on evaluation of data, and macro instruction combining means coupled to said first input means and said overlap control count storage means for accessing the associated control count word for the sequence of macro instructions;

cycle counter means for counting the number of micro instructions read and executed from each of said first and second addressable control store means;

cycle count comparison means coupled to said cycle counter means and said overlap control count storage means for comparing the control count words to the count of micro instructions executed for providing enabling signals when a predetermined relationship is determined to exist;

micro instructions execution means coupled to said first and second addressable control store means for receiving micro instructions therefrom and transmitting said micro instructions to control the processor and including overlap enabling means coupled to said cycle count comparison means for simultaneously receiving micro instruction from both of said first and second addressable control store means when said enabling signal is present, thereby providing for simultaneous execution of micro instructions from two different macro instructions; and variable sequence control means coupled to said overlap control means for receiving said data dependency indicating signals indicating that the related macro instructions is of a variable sequence dependent upon the data, and having means for receiving signals indicative that the variable portion of the sequence has been completed, said variable sequence control means coupled to said cycle counter means for inhibiting advancement of the counting operation until the end of variable sequence signal has been received.

24. A macro instruction overlap control apparatus as in claim 23 wherein said first and second addressable control store means each include addressable random access memory means; and address register means coupled to said random access storage means for providing addresses for controlling the read out of micro instructions.

25. A macro instruction overlap control apparatus as in claim 24 wherein each of said first and second addressable control store means further includes branch control means for altering the sequence of execution within the set of micro instructions in response to associated external control conditions.

26. A macro instruction overlap control apparatus as in claim 25 wherein each of said first and second addressable control store means further includes entry address means coupled to said address register means for providing the entry addresses to said address register means for the sets of micro instructions to perform associated macro instructions.

27. A macro instruction overlap control apparatus as in claim 23 wherein said first and second addressable control store means each include addressable random access memory means comprised of a plurality of addressable storage locations, each of said addressable storage locations including j bits for the storage of a micro instruction, a bits for the storage of the address of the next micro instruction, b bits for the storage of signals indicative of branch conditions that may be applicable to the associated macro instruction, and k bits for internal control; and address register means coupled to aid random access storage means for providing addresses for controlling the read out of micro instructions, the initial address provided by said second group of signals indicative of the entry addresses, and thereafter sequentially from the a bit next address field in conjunction with the b bit branch designation field of the current micro instruction.

28. A micro instruction overlap control apparatus as in claim 27 wherein each of said first and second addressable control store means further includes branch control means responsively coupled to receive b bits read with the current micro instruction and adapted to receive branch condition signals from external sources for altering the address of the next micro instruction when branch conditions are satisfied for altering the sequence of execution within the set of micro instructions in response to said external branch control conditions.

29. A macro instruction overlap control apparatus as in claim 23 and further including macro instruction completion means coupled to said cycle counter means for providing halt signals at the completion of each of said macro instructions.

30. A macro instruction overlap control apparatus as in claim 23 and further including delay control means coupled to said cycle count comparison means for alternatively providing an enable signal to allow the next macro instruction to proceed immediately or a disable signal indicative that at least one cycle of the macro instruction in operation must be completed before the next macro instruction can commence thereby allowing time for the actual one of said control count words to be selected and made available to said cycle count comparison means.

31. A macro instruction overlap control apparatus as in claim 23 wherein said cycle counter means includes a first cycle counter for providing first counts from counting micro instruction executions from said first control store means, and second a second cycle counter for providing second counts from counting micro instruction executions from said second control store means; and said cycle count comparison means includes first comparator means for comparing said control count words to said first counts and providing first ones of said enabling signals where a predetermined relationship exists, and second comparator means for comparing said control count words to said second counts and providing second ones of said enabling signals when said predetermined relationship exists.

32. A macro instruction overlap control apparatus as in claim 31 wherein each of said control count words is of a value of one less than the actual number of micro instructions that must be executed before overlap of execution of macro instructions can proceed, and said predetermined relationship is one of equality.

33. A macro instruction overlap control apparatus as in claim 23 wherein said overlap control means includes a plurality of addressable random access storage devices for storing said control count words, and selection means coupled to said macro instruction combining means for selecting the one of said plurality of addressable random access storage devices from which to read the related one of said control count words.

* * * * *

UNITED STATES PATENT AND TRADEMARK OFFICE
CERTIFICATE OF CORRECTION

PATENT NO. : 4,376,976
DATED : 15 March 1983
INVENTOR(S) : Archie E. Lahti; Kenneth L. Engelbrecht; Donald R. Kalvestrand It is certified that error appears in the above-identified patent and that said Letters Patent are hereby corrected as shown below:

Column 19, Line 36, after "control" delete "addressable";

Column 19, Line 37, after "second" insert -- addressable -- .

Column 22, Line 38, change "aid" to -- said -- .

Signed and Sealed this

Eighteenth Day of October 1983

[SEAL]

Attest:

Attesting Officer

GERALD J. MOSSINGHOFF
Commissioner of Patents and Trademarks